July 11, 1950 C. E. MAYNARD 2,514,884
INJECTION MOLDING MACHINE
Filed May 25, 1948 4 Sheets-Sheet 2

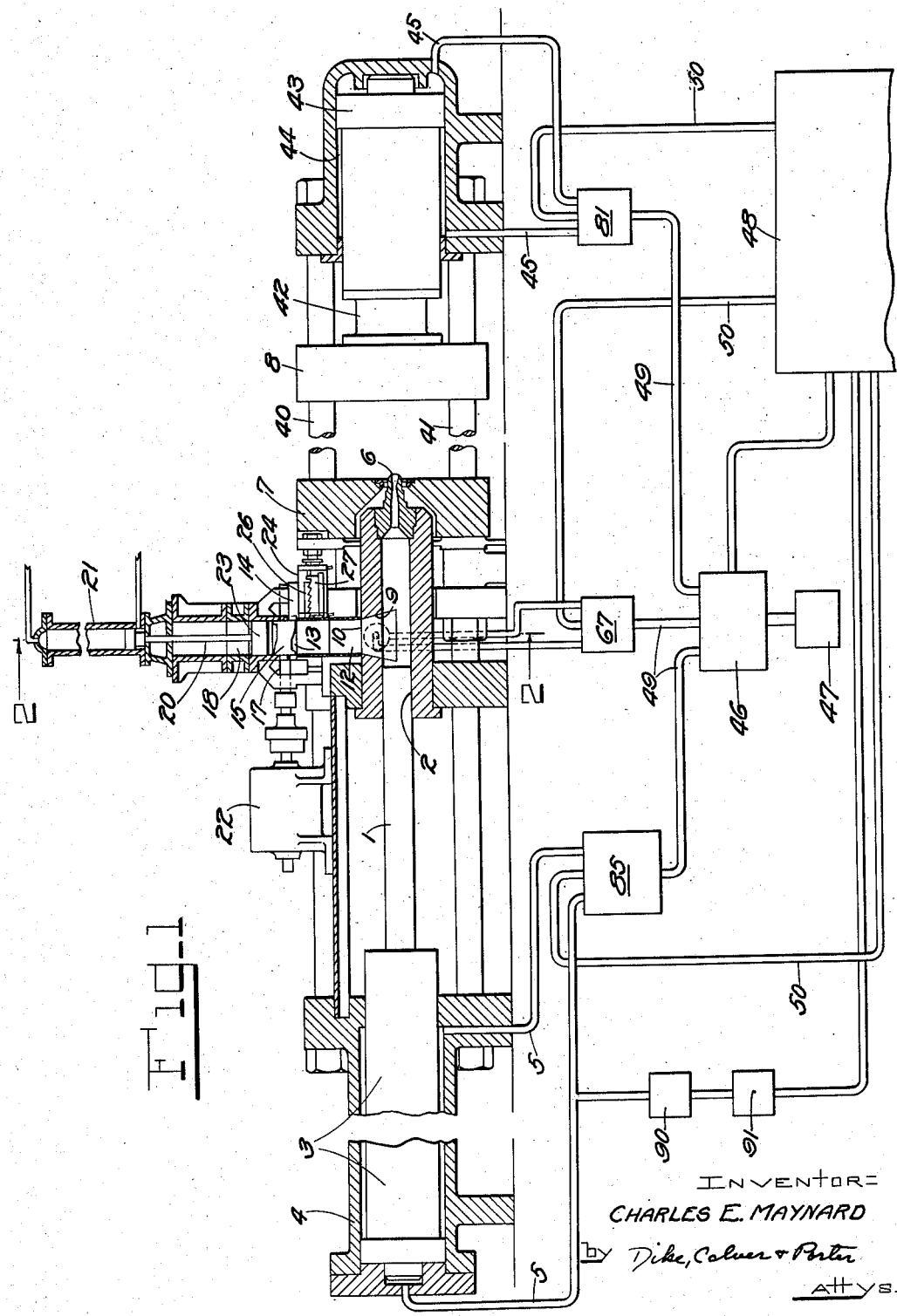

INVENTOR=
CHARLES E. MAYNARD
by Dike, Calvert Porter
Attys-

July 11, 1950 C. E. MAYNARD 2,514,884
INJECTION MOLDING MACHINE
Filed May 25, 1948 4 Sheets-Sheet 3

INVENTOR:
CHARLES E. MAYNARD
by Dike, Calver & Porter
Attys.

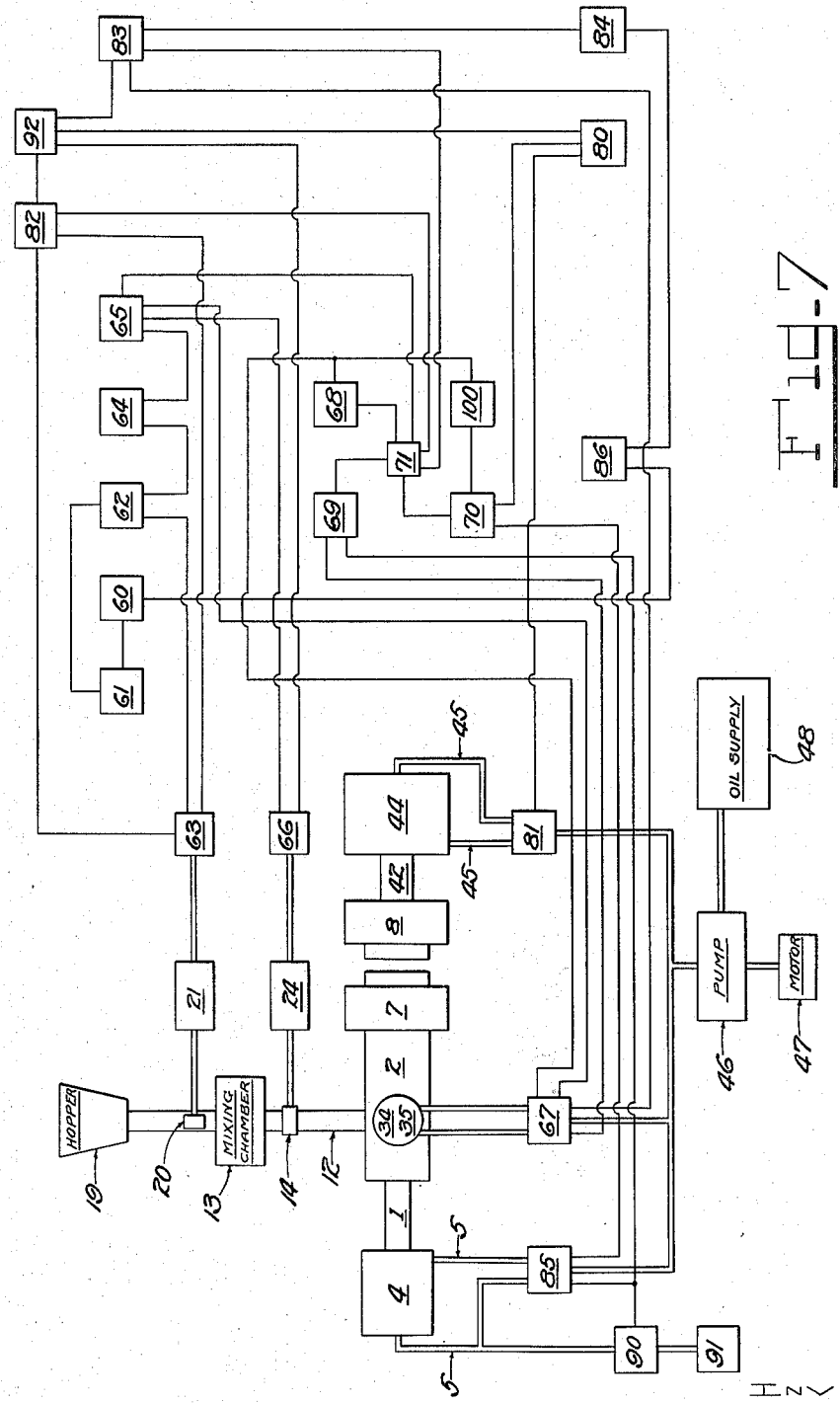

Patented July 11, 1950

2,514,884

UNITED STATES PATENT OFFICE 2,514,884

INJECTION MOLDING MACHINE

Charles Edgar Maynard, Northampton, Mass., assignor to Pro-Phy-Lac-Tic Brush Company, Northampton, Mass., a corporation of Delaware Application May 25, 1948, Serial No. 29,154

4 Claims. (Cl. 18—30)

In a previous application, Serial No. 591,910, filed May 4, 1945, now U. S. Patent No. 2,442,368 I described an improved process of making molded articles from synthetic molding materials which is particularly useful in connection with injection molding, in which a plastic material is forced through an orifice into a closed mold. This process is employed with such synthetic molding materials as cellulose acetate, methacrylate acid esters, styrene, vinyl and vinylidene chlorides, ethyl cellulose, phenol formaldehyde, urea formaldehyde resins, etc. Ordinarily these materials are used in granular or powder form. In the process of my invention these materials were pre-plasticized by the heat developed by internal friction due to working the material prior to molding. The present invention relates to a machine for carrying out the process described in said application and other procedure hereinafter described.

The machine of the present invention will best be understood from the following description in conjunction with the accompanying drawings, in which:

Fig. 1 is a longitudinal vertical section of a machine embodying the invention;

Fig. 7 is a diagrammatic view.

Figure 3:
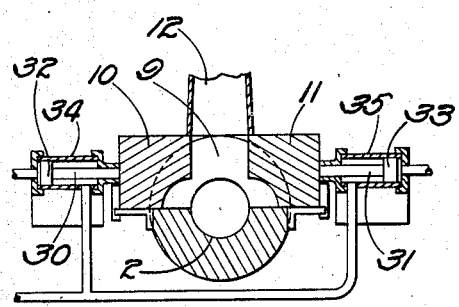
Fig. 3 shows certain parts of Fig. 2 in a different position.

In the drawings, the machine of the invention is provided with a ram 1 reciprocally movable in an injection cylinder 2 and operated by a piston 3 mounted in a cylinder 4 which derives fluid pressure from hydraulic lines indicated at 5—5. The forward end of the cylinder 2 is equipped with a nozzle 6 which extends through platen 7 which is one of a pair of platens 7 and 8. A port 9 is formed in the cylinder 2 intermediate the nozzle 6 and the face of the ram when it is fully retracted to the position shown in Fig. 1. This port 9 is closed by cylinder segments 10 and 11 (see Fig. 2) and, when open, connects the cylinder 2 with a closed conduit 12 which communicates with a chamber 13 in which the raw material is worked. Communication between conduit 12 and chamber 13 is prevented at times by a slidably mounted gate 14.

Figure 2:
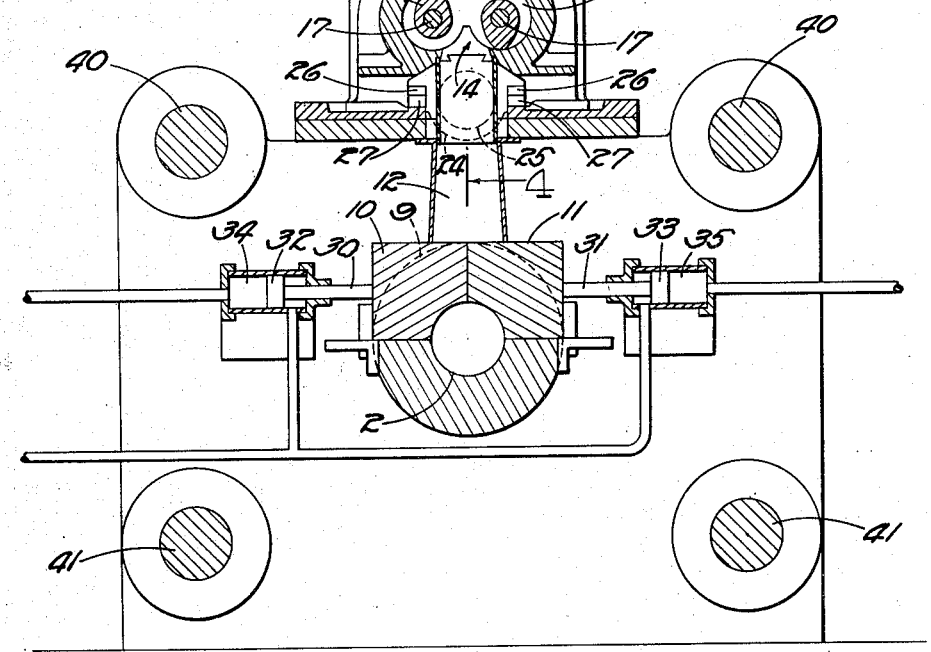
Fig. 2 is a section taken on the line 2—2 of Fig. 1.
Figure 5:
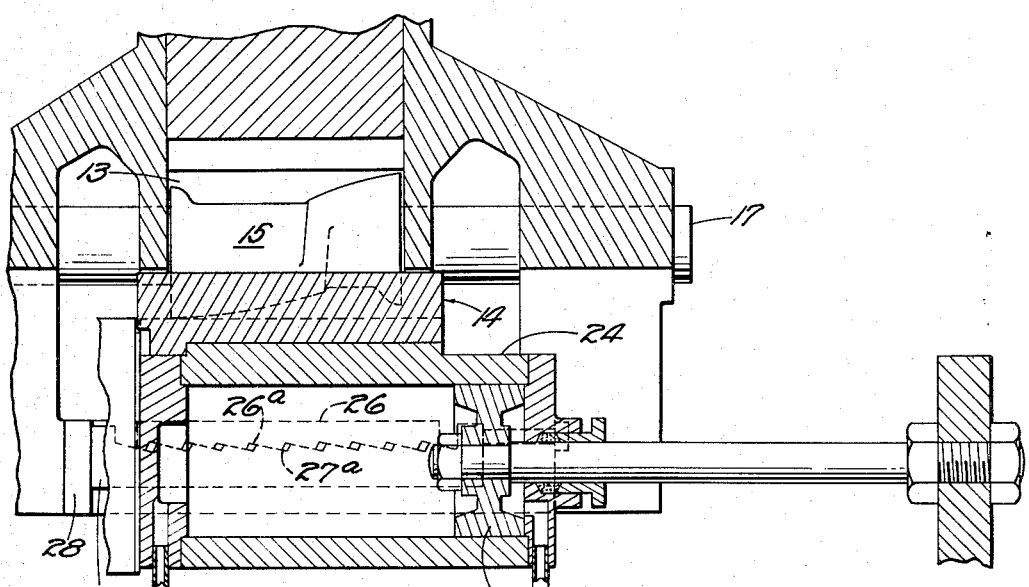
Fig. 5 is a view similar to Fig. 4 showing a different position of some of the parts.

In the chamber 13, as best shown in Fig. 2, there is a pair of rolls 15 and 16 rotatably mounted on shaft 17—17. Chamber 13 is connected by a conduit 18 to a hopper 19 in which the powdered materials are placed. The material is forced down into the conduit 18 and the chamber 13 by a ram 20 operated by suitable means such as an air cylinder 21. The rolls 15 and 16 and the chamber 13 are preferably shaped like the corresponding parts of Banbury mixers or equivalent mechanism. The shafts 17—17 carrying the rotors 15 and 16 are driven by a motor 22, (Fig. 1). During operation of the rotors, communication between the chamber 13 and the conduit 12 is prevented when the gate or closure 14 is moved to the position shown in Fig. 5. During operation of the rotors the conduit 18 will also be closed off by the head 23 of the ram 20. Thus during the working of the material the chamber 13 is closed and the rolls 15 and 16 therein give the confined material a twisting and turning motion which is sufficient to engender enough heat in the interior of the mass to plasticize it thoroughly.

Figure 4:
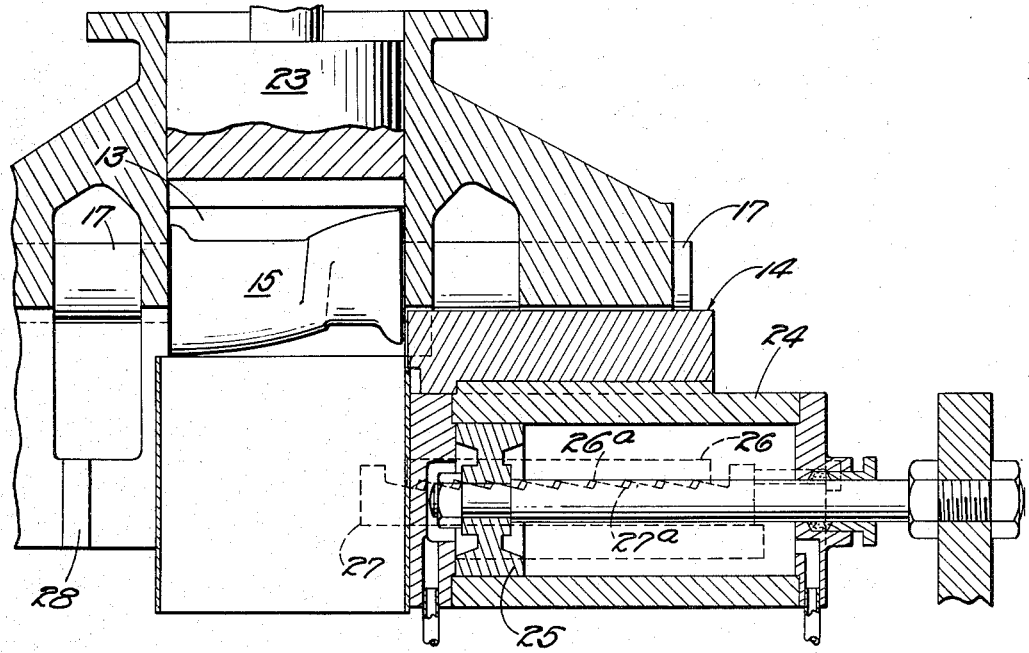
Fig. 4 is a section taken on the line 4—4 of Fig. 2.

When the material is prepared and ready for molding, the gate 14 is withdrawn to the position shown in Figs. 1 and 4. This is done by a reciprocable air cylinder 24 with a fixed piston 25. The gate is secured to the cylinder 24 and is moved with it. Secured to the cylinder 24 at opposite sides thereof there are cam bars 26—26 (Figs. 1, 4 and 5) which are provided with a series of inclined cam portions 26a. Cam bars 27—27 slidably mounted beneath the cam bars 26 are likewise provided with inclined cam portions 27a which engage the inclined cam portions 26a of the cam bar 26. The design and arrangement of the cam bars 26—26 and 27—27 is such that when the cylinder 24 is advanced to move the gate 14 from its open position (Figs. 1 and 4) to its closed position (Fig. 5) the cam bars 27—27 will be carried along with the cylinder until they engage abutments 28 just before the cylinder reaches the limit of its stroke. Thereafter, as the cylinder continues its inward motion, the gate is moved upwardly to wedge it against its seat in the walls surrounding the chamber 13. When the gate is retracted the order of these steps is reversed so that the gate is first unseated and then withdrawn during which operation the cam bars 27 are returned to the position shown in Fig. 3. The opening and closing of the gate are controlled by electrical control mechanism hereinafter described. When the gate is open, the prepared material is discharged through the conduit 12. At this time, the segments 10 and 11 are separated as shown in Fig. 3 to open port 9. The cylinder segments 10 and 11 are reciprocally moved by rams 30 and 31 which are operated by pistons 32 and 33 in hydraulic cylinders 34 and 35.

The mold sections, which are not shown in the drawings, are placed between the platens 7 and 8. The forward platen 7 may be moved away from the nozzle for the purpose of changing the form of nozzle or for the purpose of cleaning, but during use of the machine will be held fixed in position against the forward end of the machine and held braced by rods 40 and 41. The platen 8 is moved by a ram 42 urged by a piston 43 in a hydraulic cylinder 44 receiving fluid pressure from hydraulic lines 45—45.

Hydraulic pressure for each hydraulic cylinder above mentioned is derived from a pumping unit 46 which may in practice comprise a series of as many as four to six pumps driven by a power unit 47 which may in practice comprise a series of motors. A tank 48 supplies the oil for the system and serves as a reservoir during idle circulation of the oil. The conduits 49 supply fluid and pressure to the hydraulic cylinders, and conduits 50 provide for return flow. The hydraulic and air cylinders are controlled by the electrically operated valves hereinafter described.

In order to understand the nature and operation of the control mechanism, Figs. 1 and 7 may be considered jointly.

In Fig. 7, 60 indicates diagrammatically a safety gate or fence which is used to insure that the worker cannot put his hands in the machine during operation and so be injured. This fence 60 when closed activates a starter switch 61 which initiates the train of operation hereinafter described. Both the fence and the starter switch are merely indicated schematically.

At the beginning of the cycle, safety fence 60 is manually closed and pushes the starter switch 61. This energizes a control 62 which in turn activates a valve 63 causing the air cylinder 21 to operate the ram 20 (Fig. 1) which feeds material from the hopper 19 to the chamber 13. Control 62 is a form of timer switch common in the art. This control 62 runs through its cycle and at the end of its cycle closes the valve 63 which shuts off the air to cylinder 21 so that feed to the chamber 13 by movement of the feed ram 20 is stopped. At the lower end of its stroke this ram compacts the material in the chamber 13, and in its lowermost position when stationary serves as the top of the chamber 13. At this time control 62 energizes control switch 64 which in turn governs the working time of the material in the chamber 13. The working continues until the desired state of plasticity is obtained in the material, without scorching or setting. This may be regulated by thermostatic control or by time control, either providing that the material will be worked until thoroughly plasticized. Control 64 then at the end of its predetermined heat or time cycle energizes control 65 which actuates valve 66 which causes the plasticized material to be dumped by operating the air cylinder 24 which causes the gate or door 14 at the bottom of the chamber 13 to be drawn to one side to permit communication with the conduit 12. At this stage of the operation the segments 10 and 11 are standing withdrawn in their open position (Fig. 3) and the plasticized material is discharged and drops freely into the injection cylinder 2 ahead of the injection ram which is now standing withdrawn to its rearmost position as shown in Fig. 1.

When the material has been placed in the cylinder the control 65 actuates valve 67 which causes the injection cylinder segments to close by the operation of paired hydraulic cylinders 34 and 35 and rams 30 and 31 (Fig. 2). When the segments are completely closed (Fig. 2) a segment interlock switch 68 actuates either control 69 or control 70 according to the setting of a manually controlled switch 71. Depending on whether control switch 70 or control switch 69 is activated, the machine will proceed to inject into the mold the charge of material in the injection cylinder, or will compact the material therein and supply another charge and then inject it into the mold.

Assuming that control switch 70 is energized, then control 70 energizes control 80 which operates valve 81 which causes the mold cylinder 44 to move mold clamping ram 42 forward to close the mold. At the same time, control 65 energizes either control 82 or control 83, depending on the setting of switch 71. If switch 71 is turned to activate switch 70, then control 83 is activated. Control 83 energizes control switch 84 to initiate a cycle thereof. In timed relation, control switch 70 operates valve 85 which causes hydraulic cylinder 4 to move the ram 1 to inject the material into the mold. The machine stays in this position a predetermined length of time as determined by control valve 70. When the time has elapsed, control 70 functions to operate valve 85 again and, with the changed setting of the valve, the hydraulic cylinder 4 causes retraction of the ram 1. Simultaneously, the segments 10 and 11 are retracted to open port 9, as valve 67 is operated with valve 85 on the return stroke of the injection ram 1, the complete cycle of control 70 activating control 65. With the ram all the way back, the machine remains in this position until the setting of control 80 is reached, whereupon it operates valve 81 again and the mold clamping ram is retracted to open the mold. When the mold is fully open, all controls except control 84 are automatically reset for a new cycle. With the mold open, the operator can open the safety fence. By this time control 84 has run its cycle and, if the automatic repeat cycle control 86 is on, the machine will go through its operative plasticizing and molding cycle when the safety fence 60 is again closed by the operator thus closing the starting switch 61. The pumping unit 46 supplies oil under pressure to move the several pistons of the hydraulic cylinders, the oil being automatically by-passed by relief valves when control valve settings do not call for operation of the rams. If the platen 7 is moved by a hydraulic cylinder, its operation will be manually controlled, and so is not related to the cycle of operations above described.

In the second method of operation, the manual switch 71 is set to cause the injection cylinder to receive two charges of the material before injection takes place, the first charge of material being compacted before admission of the second charge. In this event, assuming that preliminary feeding, working and dumping have already taken place, as described above, control 68 energizes control 69 instead of control 70. Control switch 69 energizes valves 85 and 90, which cause the injection ram 1 to go forward under low pressure by operation of cylinder 4. Valve 91 regulates the low pressure, by-passing the excess oil to the tank.

The forward movement of the ram compacts plasticized material in the front part of the injection cylinder. At the same time, control 65 energizes control 82 which in turn energizes valve 63. This causes a new charge of material to be placed in chamber 13 by action of the air cylinder 21 and ram 20. When control 82 ends its cycle material is no longer fed to the mixing chamber and again the head 23 of the stationary ram serves as the top of the chamber 13. At this point control 92 is energized by control 82 and control 92 determines the time necessary for plasticizing the material to the desired state. It may be a time limit control switch or a thermostatically controlled switch, and it operates in the same manner as control 64. When this process is completed control 92 energizes control 83. Before this happens, however, control 69 has gone through its cycle and in so doing causes injection ram 1 to go back by operation of hydraulic cylinder 4 which is controlled by valve 85 and simultaneously the segments are opened by the action of hydraulic cylinders 34 and 35 controlled by valve 67. Also when control 82 energizes control 92 it likewise energizes control 80 which in turn causes the mold clamping ram 42 to go forward due to action of hydraulic cylinder 44 which is controlled by valve 81. When control 92 functions it also causes operation of valve 66 and the material is dumped from the chamber 13 to the injection cylinder 2 through the port 9.

When the injection cylinder is fully charged control 83 operates to energize control 84 and also energizes valve 67 which causes the segments to be closed by action of the hydraulic cylinders 34 and 35.

When the segments 10 and 11 are closed segment interlock 100 energizes control 70 which in turn energizes valve 85 alone causing the injection ram 1 to go forward under high pressure under the action of the hydraulic cylinder 4 as previously described in the first mode of operation. This action causes the combined charges of material to be forced into the mold.

The ram remains in its forward position a predetermined time as determined by control 69, whereupon as heretofore described valve 85 is again operated and, with the changed setting of the valve, the ram 1 is retracted and the injection cycle is completed, allowing control 65 to operate valve 67 and cause the segments 10 and 11 to be retracted as the ram returns. Then, as heretofore, the setting of control 80 is reached and valve 81 is operated to open the mold, and all controls except 84 are automatically reset for a new cycle. When control 84 completes its cycle, the complete sequence of operations of the machine will be repeated if automatic control 86 is on.

In a third method of operation the ram is caused to inject only a part of the material supplied to the injection cylinder at one molding so that a plurality of moldings are made for each charge. This is done by operating the relief valve in the injection cylinder line to reduce the pressure behind the ram to a point where it is held stationary at the end of the first short stroke, then increasing the pressure after the molds have been emptied and closed so as to inject a second charge, and repeating until the ram has been advanced the full distance to the end of its travel and all of the charge has been utilized in successive moldings. Since the ram is not withdrawn between successive short strokes, the segments will not open until the last injection is completed and the ram returns to its starting position.

Figure 6:
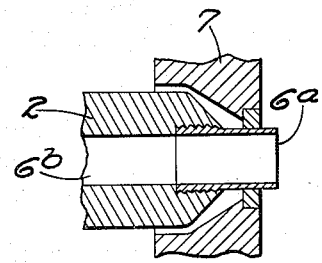
Fig. 6 is a detail view of a substitute part.

The machine may be used for either thermoplastic or thermosetting materials. The nozzle 6 shown in Fig. 1 is used for thermoplastic material. If it is desired to mold a thermosetting material, the nozzle 6 is removed and the nozzle 6a shown in Fig. 6 is inserted in its place, either nozzle fitting into the bore 6b at the end of the injection cylinder.

The electrical switches used are known types of time and limit switches, and the valves used are common in the field of hydraulic engineering. The major valves are four-way valves having spools acted upon by supplemental hydraulic lines and, if desired, activated by pilot valves employing solenoids. The word "valve" is sometimes used to indicate a valve unit or system. The construction of these valves does not constitute a part of the invention.

The machine of the invention provides a greater degree of variability in operation than known molding machines, and is particularly adapted to mold a great many small articles in a short time if the third method is used or a single very large article if the first or second methods are used. The material is taken from the working chamber at the moment when it is ready to mold and is maintained in this condition if not immediately molded by heating the injection cylinder enough to maintain the temperature of the material but not enough to increase it. The molding follows automatically and in timed relation to the working. Also, it is possible to use a relatively short stroke, as it is not necessary for the ram to condense a large bulk of unprepared material or to serve as means for shutting the feed port.

I claim:

1. In a machine for molding plastic material, in combination, an injection cylinder, an injection ram in said cylinder, means for moving the ram, a pre-plasticizing chamber spaced from the cylinder, a conduit connecting the chamber and the cylinder, said conduit including a port in said chamber and a port in said cylinder, a closure means for the first named port adapted to form a part of the chamber wall and a second closure means for the second named port adapted to form a part of the cylinder wall.

2. A machine for molding plastic materials having, in combination, an injection cylinder, an injection ram in the cylinder, a chamber for holding plasticizable material spaced from the cylinder, rotors within said chamber adapted to give said material a twisting and churning motion creating heat therein by internal friction, means for giving said rotors a continuous rotative motion during operation of said machine, a port in the bottom of the chamber, a closure for the port, means for moving the closure, a port in the top of the injection cylinder, a closure for said port, hydraulic means for moving said injection ram and said second named closure, a control mechanism which regulates the action of said first-named closure moving means and a second control mechanism responsive to said first control mechanism which initiates operation of said hydraulic means first to close said second port and in timed sequence thereto move the injection ram through a cycle of molding operations.

3. In a machine for molding plastic material, in combination, an injection cylinder, an injection ram in said cylinder, means for moving the ram, a pre-plasticizing chamber spaced from the cylinder, a conduit connecting the chamber and the cylinder, said conduit including a port in said chamber and a port in said cylinder, a closure means for the first named port adapted to form a part of the chamber wall and a second closure means for the second named port adapted to form a part of the cylinder wall, control means for regulating the plasticizing of material in the chamber, and control means responsive thereto for operating said second closure means.

4. In a machine for molding plastic material, in combination, an injection cylinder, an injection ram in said cylinder, means for moving the ram, a pre-plasticizing chamber spaced from the cylinder, a conduit connecting the chamber and the cylinder, said conduit including a port in said chamber and a port in said cylinder, a closure means for the first named port adapted to form a part of the chamber wall and a second closure means for the second named port adapted to form a part of the cylinder wall, control means for regulating the plasticizing of material in the chamber, and control means responsive thereto for operating said second closure means, and control mechanism operated by said second closure means for initiating movement of said ram.

CHARLES EDGAR MAYNARD.

REFERENCES CITED

The following references are of record in the file of this patent:

UNITED STATES PATENTS

| Number | Name | Date |
|---|---|---|
| 2,111,857 | Jeffery | Mar. 22, 1938 |
| 2,296,296 | Shaw | Sept. 22, 1942 |
| 2,411,254 | Frank | Nov. 19, 1946 |
| 2,439,966 | Dinzl | Apr. 20, 1948 |
| 2,442,368 | Maynard | June 1, 1948 |
| 2,443,554 | De Mattia | June 15, 1948 |
| 2,454,661 | Lester et al. | Nov. 23, 1948 |
| 2,477,258 | MacMillin | July 26, 1949 |